United States Patent [19]

Salo

[11] Patent Number: 4,459,315

[45] Date of Patent: Jul. 10, 1984

[54] COMPOSITE GRANULAR REFRESHMENT MATERIAL AND PROCESS FOR PREPARING THE SAME

[76] Inventor: Hannu Salo, Laajavuorenrinne 4 A 5, 01620 Vantaa 62, Finland

[21] Appl. No.: 498,665

[22] PCT Filed: Mar. 10, 1981

[86] PCT No.: PCT/FI81/00016

§ 371 Date: Nov. 9, 1981

§ 102(e) Date: Nov. 9, 1981

[87] PCT Pub. No.: WO81/02507

PCT Pub. Date: Sep. 17, 1981

Related U.S. Application Data

[63] Continuation of Ser. No. 321,163, Nov. 9, 1981, abandoned.

[30] Foreign Application Priority Data

Mar. 12, 1980 [FI] Finland ................................. 800769

[51] Int. Cl.³ .......................... A23F 3/14; A23F 3/34; A23F 5/14
[52] U.S. Cl. .................................... 426/590; 426/595; 426/597; 426/285; 426/96; 426/454; 426/448
[58] Field of Search ............... 426/454, 448, 595, 597, 426/590, 96, 285

[56] References Cited

U.S. PATENT DOCUMENTS 2,120,138  6/1938  Mathews et al. ................... 426/448
3,047,396  7/1962  Steinberg ........................ 426/597 X
3,083,104  3/1963  Celmer ............................ 426/422 X
3,459,558  8/1969  Farmer et al. ...................... 426/454
3,511,666  5/1970  Hudson et al. .................. 426/454 X
4,160,042  7/1979  Farr et al. ....................... 426/422 X

FOREIGN PATENT DOCUMENTS 808588  3/1969  Canada ............................... 426/454

OTHER PUBLICATIONS

Sivetz, Coffee User's Guide, 1963, Coffee Publications, San Anselino, Calif., pp. 47–48.
Sivetz, Coffee Processing Technology, vol. II, 1963, Avi: Westport, Conn., pp. 27–29, 166–167.
Pintauro, Soluble Coffee Manufacturing Processes, 1969, Noyes Development Corp.: Park Ridge, N.J., p. 28.

Primary Examiner—Joseph M. Golian
Attorney, Agent, or Firm—Mason, Fenwick & Lawrence

[57] ABSTRACT

Coffee, tea, herb preparation or a like refreshment in granular or flaky form for use as a drink dissolved in a liquid by extraction or cooking. The refreshment contains 5–50% of an inert, water insoluble carrier which is polymeric or polymerizing material, preferably α-cellulose. The carrier forms granules or fibers to whose surface said refreshment is adhered in fine-powdered form and the finished product is ground into desired coarseness. The fine-powdered refreshment and the inert carrier are mixed by extrusion by applying heat and pressure.

6 Claims, 1 Drawing Figure

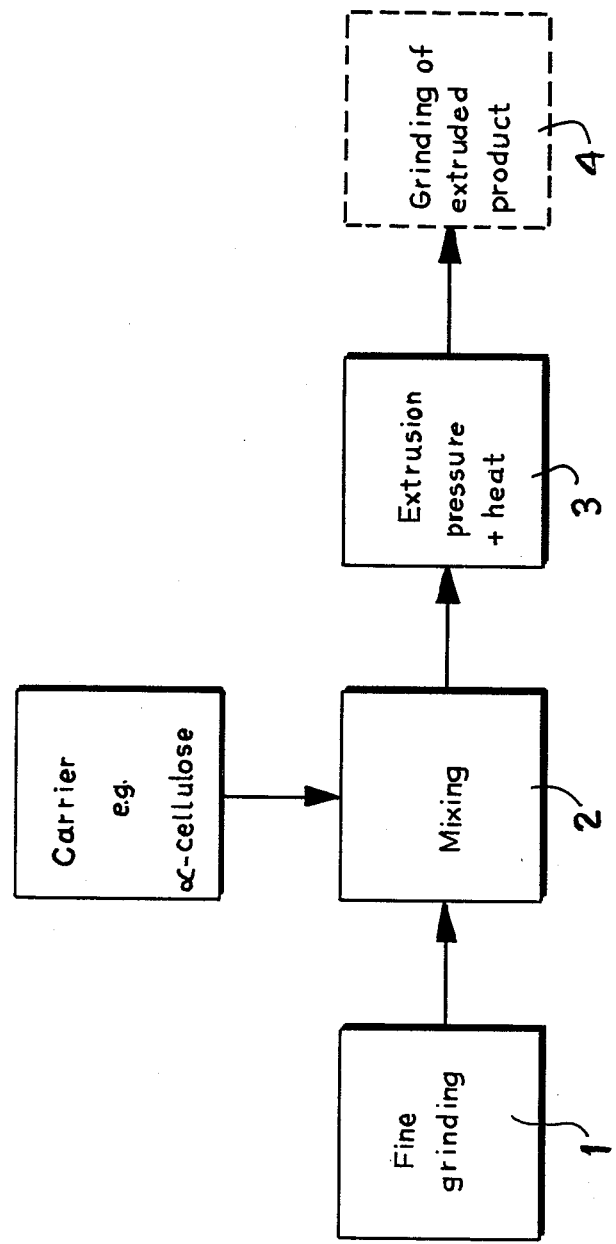

COMPOSITE GRANULAR REFRESHMENT MATERIAL AND PROCESS FOR PREPARING THE SAME

This application is a continuation of application Ser. No. 321,163, filed Nov. 9, 1981, now abandoned.

Granular or flaky refreshment composition, especially for use as a drink when dissolved in a liquid by extraction or cooking, as well as a process for the preparation thereof.

FIELD OF THE INVENTION

The present invention relates to a granular or flaky refreshment as well as to a process for the preparation thereof, said refreshment composition being intended to be used as a drink when dissolved in a liquid by extraction or cooking. Such drinks include coffee, tea and also herb preparations as flavoring substances.

For the sake of clarity, the invention will be explained in the following specification in connection with its most significant embodiment, i.e. the preparation of coffee.

BACKGROUND OF THE INVENTION

The present coffee making methods, filtration and boiling, require coffee powder of certain coarseness. In both cases, the degree of grinding is so coarse that considerable amount of flavour remains within the granules and thus the raw material will be incompletely exploited.

OBJECT OF THE INVENTION

The object of the invention is to provide a granular or flaky refreshment composition of the above type from which flavouring agent extraction will be a lot more effective than at present, the raw material thus being exploited better than at present.

SUMMARY OF THE INVENTION

To accomplish this object the present invention is characterized in that the refreshment composition contains 5-50% of an inert, water insoluble carrier which is a polymeric material which forms granules or fibers to whose surface the flavoring substance is adhered in fine-powdered form, and the finished product is ground to desired coarseness. With the refreshment ground into a fine dusty form, a large extraction surface is obtained and flavouring agents can be effectively extracted. On the other hand, this does not interfere with conventional drink making methods by filtration or boiling since the fine-powdered material is adhered to the surface of major granules or fibers of the carrier. By inert carrier the intention is to point out that the inert carrier does not substantially release taste or odour, nor does it react with the flavoring substance even when subjected to heat. Such carriers can comprise polymeric or polymerizing materials having long fibers. α-cellulose has proved to be a particularly preferred carrier.

The present preparation process is characterized in that the flavoring substance is fine-powdered and mixed with 5-50% of a granular or fibrous, inert carrier and adhered to the surface of granules or fibers of the carrier by extrusion by applying heat and pressure, said carrier being of polymeric material and finally the extruded product is ground for intended use into desired granular coarseness.

Thus, the heat and pressure required for adhering the flavoring substance to the carrier are generated in an extruder. For the end use, the extruded product is ground to granular coarseness conventional to this particular flavoring material. Depending on the materials employed, the product obtained from the extruder can be temporarily stored prior to grinding it to desired final coarseness.

BRIEF DESCRIPTION OF THE DRAWING

The attached schematic drawing presents the preparation steps of the product of the invention.

DETAILED DESCRIPTION OF THE INVENTION

In the drawing, step 1 refers to fine grinding for grinding e.g. coffee into fine dust form. In step 2, fine-powdered coffee and a suitable carrier, such a α-cellulose, are mixed. In step 3, the mixture is subjected in an extruder to heat and pressure. Hence, the setting temperature can vary within the range of 100°-180° C. and temperature of the mass of 90°-170° C. as well as pressure within the range of 50-300 bar. The amount of carrier varies within the range of 5-50% of the total weight of the product, the most suitable amount being 25-30%. Extruded material is ground to conventional granular coarseness for coffee, i.e. either to filtration coarseness or regular pot coarseness, followed by packing. Extruded material can also be stored and transported in unground state.

The above steps 2 and 3 can in practice be combined, so that the carrier and fine-powdered coffee are passed into an extruder in which they are mixed and adhered together simultaneously. For sufficient adhering surface it is preferable that the carrier comprises a material having long fibers in an amount of nearly half of the total amount of the product.

EXAMPLE 1

Coffee was fine-ground to coarseness shown in table below:

| Screen size ASTM-standard | 16 | 20 | 30 | bottom |
|---|---|---|---|---|
| Yield % of total amount | 0.5 | 0.8 | 11.1 | 87.6 |

90% by weight of fine-powdered coffee and 10% by weight of α-cellulose were mixed. Moisture of the mass was 20% and it was fed in an extruder at a feed rate of 200 g/min. The extruder was provided with 5 auger screws, rotational speed was 50 rpm and power consumption of the motor 11 kW. Heating was performed with 7 kW induction heaters. Setting temperature was 140° C. and the measured mass temperature in the extruder was 129° C. Pressure varied within the range of 7-8 MPa. The orifice diameter of the extruder was 5 mm. The extruded product was ground to the coarseness shown in table below corresponding to rather fine pot coarseness.

| Screen size ASTM standard | 16 | 20 | 30 | 40 | bottom |
|---|---|---|---|---|---|
| Yield % of total amount | 8.5 | 23.5 | 27.6 | 24.1 | 16.3 |

The end product was processed into a drink by using the product in the amount of 60 g/l. A test group verified that coffee flavour was flawless.

EXAMPLE 2

75% of fine-ground tea and 25% of $\alpha$-cellulose were mixed and fed in an extruder at a feed rate of 300 g/min. Moisture of the mass was 10%. Power consumption of the extruder drive motor was 24 kW and the mass was heated with 10 kW induction heaters. Setting temperature was 140° C. and the measured mass temperature 128° C. In the extruder the mass was subjected to a pressure of 8.2 MPa. The mass was extruded through an orifice of 5 mm in diameter, cut into pieces which were ground into substantially the same grinding coarseness as the end product of example 1. A test group verified that the tea prepared from the product has flawless flavour.

I claim:

1. A granular composition for making a flavored beverage by extraction with water which comprises a mixture in granular form consisting essentially of 5–50% of an inert water insoluble fibrous cellulosic carrier and adhered to said fibrous cellulosic carrier 50–95% finely divided powder of a natural flavor material containing a water extractable flavoring agent, said percentages being by weight of said mixture and the granules of said mixture being generally larger than said said flavor material powder.

2. A composition as defined in claim 1, wherein said carrier comprises $\alpha$-cellulose.

3. A composition as defined in claim 1, wherein said natural flavoring material comprises coffee ground into fine dusty form.

4. A process for preparing the composition of claim 1 which comprises admixing 5–50% of an inert water insoluble fibrous cellulosic carrier with 50–95% of a natural flavoring material containing a water extractable flavoring agent, said material being in finely divided powdered form, extruding said admixture under sufficient heat and pressure to cause said finely divided powder of said material to adhere to said fibrous carrier, and granulating the extruded mixture to a size generally larger than the finely divided powder of said flavoring material.

5. A process as defined in claim 4, wherein said carrier comprises $\alpha$-cellulose.

6. A process as defined in claim 4, wherein said extrusion is carried out at a temperature of 90°–170° C. and a pressure of 50–300 bar.

* * * * *